(12) United States Patent
Steeneken et al.

(10) Patent No.: US 10,267,702 B2
(45) Date of Patent: Apr. 23, 2019

(54) FORCE SENSOR WITH COMPENSATION

(71) Applicant: NXP B.V., Eindhoven (NL)

(72) Inventors: Peter Steeneken, Valkenswaard (NL); Jozef van Beek, Eindhoven (NL); Willem Besling, Eindhoven (NL)

(73) Assignee: NXP B.V., Eindhoven (NL)

( * ) Notice: Subject to any disclaimer, the term of this patent is extended or adjusted under 35 U.S.C. 154(b) by 442 days.

(21) Appl. No.: 14/718,257

(22) Filed: May 21, 2015

(65) Prior Publication Data

US 2015/0355043 A1  Dec. 10, 2015

(30) Foreign Application Priority Data

Jun. 9, 2014 (EP) .................................... 14171660

(51) Int. Cl.
 *G01L 25/00* (2006.01)
 *G01L 1/10* (2006.01)
 *G01L 1/26* (2006.01)
 *G01Q 60/24* (2010.01)

(52) U.S. Cl.
 CPC ............... *G01L 25/00* (2013.01); *G01L 1/10* (2013.01); *G01L 1/26* (2013.01); *G01Q 60/24* (2013.01)

(58) Field of Classification Search
 None
 See application file for complete search history.

(56) References Cited

U.S. PATENT DOCUMENTS

| 7,574,327 | B2* | 8/2009 | de Roover | G01Q 10/06 |
| | | | | 702/188 |
| 2005/0109925 | A1* | 5/2005 | El Rifai | G01Q 40/00 |
| | | | | 250/234 |
| 2010/0154553 | A1 | 6/2010 | Phan Le et al. | |
| 2010/0300215 | A1 | 12/2010 | Eilersen | |

(Continued)

FOREIGN PATENT DOCUMENTS

| CN | 101281071 A | 10/2008 |
| CN | 201344938 Y | 11/2009 |

(Continued)

OTHER PUBLICATIONS

Ohler, "Cantilever spring constant calibration using laser Doppler vibrometry" Review of Scientific Instruments 78, 063701 (2007).*

(Continued)

*Primary Examiner* — John C Kuan (57) ABSTRACT

Aspects of the present disclosure are directed to force sensors. As may be implemented in accordance with one or more embodiments, an apparatus includes a force-responsive component having a resonant frequency, and a circuit that compensates for variations with the force-responsive component. The force-responsive component moves in response to an applied force, in accordance with a spring constant that is susceptible to fluctuation. The compensation circuit determines Brownian motion of the force-responsive component at the resonant frequency based on temperature, and generates an output based on the determined Brownian motion and movement of the force-responsive component. Such an output is indicative of force applied to the apparatus.

12 Claims, 4 Drawing Sheets

(56) References Cited

U.S. PATENT DOCUMENTS

| | | | |
|---|---|---|---|
| 2013/0125269 A1* | 5/2013 | Su | G01Q 30/00 850/8 |
| 2014/0167789 A1* | 6/2014 | Cagdaser | G01R 27/2605 324/683 |
| 2015/0241470 A1* | 8/2015 | Wu | G01Q 60/30 850/22 |
| 2015/0301080 A1* | 10/2015 | Proksch | G01Q 60/24 850/33 |

FOREIGN PATENT DOCUMENTS

| | | | |
|---|---|---|---|
| CN | 101711348 A | | 5/2010 |
| CN | 101939627 A | | 1/2011 |
| EP | 0 136 627 A2 | | 9/1984 |
| GB | 2 171 201 A | | 8/1986 |
| GB | 2 189 319 A | | 10/1987 |

OTHER PUBLICATIONS

Cook et al., "Practical implementation of dynamic methods for measuring atomic force microscope cantilever spring constants" Nanotechnology 17 (2006) 2135-2145.*

Lozano, Jose R. et al; "Calibration of higher eigenmode spring constants of atomic force microscope cantilevers"; Nanotechnology, IOP, Bristol, GB, vol. 21; 7 pages (Nov. 19, 2010).

Grober, Robert D, et al; "Fundamental limits to force detection using quartz tuning forks"; Review of Scientific Instruments, AIP, Melville, NY, US, vol. 71, No. 7; pp. 2776-2780 (Jul. 1, 2000).

Boudaoud, Mokrane, et al; "Study of thermal and acoustic noise interferences in low stiffness atomic force microscope cantilevers and characterization of their dynamic properties"; Review of Scientific Instruments, AIP, Melville, NY, US, vol. 83, No. 1; pp. 013704-1 to 013704-10 (Jan. 1, 2012).

Rebeiz, Gabriel M.; "Phase-Noise Analysis of MEMS-Based Circuits and Phase Shifters"; IEEE Transactions on Microwave Theory and Techniques, IEEE Service Center, Piscataway, NJ, US, vol. 50, No. 5; pp. 1316-1323 (May 1, 2002).

Gabrielson, Thomas B.; "Mechanical-Thermal Noise in Micromachined Acoustic and Vibration Sensors"; IEEE Transactions on Electron Devices, vol. 40, No. 5; pp. 903-909 (May 1, 1993).

Malovichko, I.M.; "Measuring AFM Cantilever Stiffness from a Thermal Noise Spectrum"; Bulletin of the Russian Academy of Sciences: Physics, vol. 77, No. 8; pp. 972-974 (2013).

Burnham, N.A. et al; "Comparison of calibration methods for atomic-force microscopy cantilevers"; Institute of Physics Publishing, Nanotechnology 14, UK; 6 pages (2003).

Hutter, Jeffrey L. et al; "Calibration of atomic-force microscope tips"; AIOP, Rev. Sci. Instrum. vol. 64, No. 7; pp. 1868-1873 (Jul. 1993).

Steeneken, P.G., et al; "Piezoresistive heat engine and refrigerator"; Nature Physics 7; pp. 354-359; (2011).

Extended European Search Report for Application No. 14171660.5 (dated Dec. 18, 2014).

* cited by examiner

FIG. 4

FORCE SENSOR WITH COMPENSATION

CROSS-REFERENCE TO RELATED APPLICATIONS

This application claims the priority under 35 U.S.C. § 119 of European patent application no. 14171660.5, filed Jun. 9, 2014 the contents of which are incorporated by reference herein.

FIELD

Aspects of various embodiments are directed to force sensing and sensors.

BACKGROUND

Various sensors such as pressure sensors, accelerometers, gyros, and microphones measure an external force by detecting the displacement of a mechanical structure. The displacement of this structure is converted to an external signal. However, variations in the sensor and the displacement detector can vary in time. For instance, accurate force measurement benefits from accurately knowing the spring constant k of the sensor. This constant can vary during operation due to, for example, variations in ambient conditions such as temperature, stress, thermal expansion and their effect on the spring constant. The spring constant can also vary due to permanent (irreversible) changes in the material and sensor properties, ageing, degradation, fatigue, contamination, threshold voltage shifts, charging and other mechanical and electronic variations in the sensor. Variations in manufacturing processes may also cause variations in the spring constant.

Due to variations that affect sensor operation including those discussed above, calibration can be important for ensuring sensor accuracy. Calibration often involves using a reference force of known value. However, it can be difficult to generate a constant reference force for a variety of applications. For example, electrostatic forces can drift significantly due to effects such as gap variation (e.g., due to temperature, stress or fatigue), charge accumulation and voltage drifts.

These and other matters have presented challenges to sensors and their implementation, for a variety of applications.

SUMMARY

Various example embodiments are directed to sensors and their implementation.

According to an example embodiment, an apparatus includes a force-responsive component that exhibits a resonant frequency and moves in response to an applied force, with the movement being in accordance with a spring constant that is susceptible to fluctuation. A compensation/calibration-type circuit determines Brownian motion of the force-responsive component at the resonant frequency based on temperature. An output is generated based on the determined Brownian motion and movement of the force-responsive component, which is indicative of force applied to the apparatus.

Other example embodiments are directed to methods that may be consistent with the above. A force-responsive component is provided which has a resonant frequency and which moves in response to an applied force, in accordance with a spring constant that is susceptible to fluctuation. Brownian motion of the force-responsive component at the resonant frequency is determined based on temperature. An output is generated based on the determined Brownian motion and movement of the force-responsive component, providing an indication of force applied to the apparatus.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving sensor applications that implement Brownian noise, such as for calibrating mechanical sensors using Brownian noise as a basis. While not necessarily so limited, various aspects may be appreciated through a discussion of examples using this context.

Various example embodiments are directed to sensor applications that implement Brownian noise, such as by compensating or calibrating mechanical sensors based on Brownian noise. Certain embodiments are directed to on-chip calibration that corrects for sensor variations, based on electronic measurement of Brownian motion of the chip. Such approaches may be implemented for pressure sensing, accelerometers, gyroscopes that measure Coriolis forces, microphones that measure gas pressures, atomic force microscopes that measure contact forces, and other force-based sensing applications.

Various embodiments are directed to implementation with mechanical sensors, and addressing challenges such as those described in the background above, as may relate to obtaining an accurate absolute measurement of applied force $F_{ext}$. The applied force is evaluated based on a spring constant of the sensor, which is adjusted via Brownian noise to accommodate variations in ambient conditions such as temperature, stress, thermal expansion and their effect on the spring constant, and to accommodate permanent (irreversible) changes in material and sensor properties such as those involving ageing, degradation, fatigue, contamination, threshold voltage shifts, charging and other mechanical and electronic variations in the sensor. After initial calibration, a sensor relation $V_{out}=a_0/k_0 F_{ext}$ is determined such that the value of the force $F_{ext}$ can be ascertained by measuring $V_{out}$ and adjusting, via Brownian noise, for changes in the constant k (e.g., given by $a(t)=a_0+\Delta a(t)$ and $k(t)=k_0+\Delta k(t)$).

In accordance with another embodiment, an apparatus includes a force-responsive component that moves in response to an applied force in accordance with a spring constant that is susceptible to fluctuation, and operable with a resonant frequency. Such a component may, for example, include a mass component and a spring component, as may be implemented with a pressure sensor, motion sensor or a variety of devices. A circuit coupled to the force-responsive component determines Brownian motion thereof, at the resonant frequency, based on temperature (e.g., and upon a detected displacement of a mass in the pressure-responsive component). An output is generated, which is based on the determined Brownian motion and movement of the force-responsive component, and is indicative of force applied to the apparatus.

In some implementations, the Brownian motion is used to determine a change in a value of the spring constant, and an output is generated using the determined change in value. This output correlates the detected movement of the force-responsive component to the force applied to the apparatus. In a more particular implementation, a model of the movement of the force-responsive component is used to generate the output, in which the model is based upon characteristics of the force-responsive component including mass, temperature, geometry, damping, resonant frequency and the spring constant. In another implementation a model is used to determine the spring constant from the measured Brownian motion. The model is based upon characteristics of the force-responsive component, such as mass, temperature, damping, resonant frequency, and geometry. The model may also be based on the characteristics of the Brownian motion detector and the temperature.

In a more particular embodiment, a spectrum analyzer is coupled to detect a Brownian motion-based peak in resonance of the force-responsive component. The peak is integrated over a frequency range and the result of the integration is used to determine the Brownian motion of the force-responsive component, near or at the resonant frequency.

Force-responsive components as discussed above are implemented in a variety of manners, to suit various applications. In some embodiments, such a force-responsive component provides a voltage output that characterizes the applied force, and that varies based upon the applied force and fluctuations in the spring constant. A temperature sensor senses temperature used in determining the Brownian motion, and a reference circuit provides a reference value for calibrating/compensating for motion detection with the force-responsive component (e.g., providing capacitance, resistance and/or voltage values that may be fixed). A spectrum analyzer having a fixed amplitude and frequency range is operable to analyze a value corresponding to a response of the force-responsive component to pressure. As such, displacement of the force-responsive component is detected using the fixed-capacitance source as a reference. Brownian motion noise is estimated based on an output of the spectrum analyzer indicative of a Brownian motion-based peak in resonance of the voltage output, and the estimated Brownian motion noise and detected temperature are used to determine a value of the spring constant. An output is then generated by determining pressure applied to the force-responsive component, based on the determined value of the spring constant, a model that relates the force on the sensor to the pressure and the detected displacement. In some implementations, a model that describes dependence of the voltage on atmospheric parameters is used to generate an output indicative of a corrected/compensated or calibrated senses pressure.

In another embodiment, a force-responsive component as discussed herein provides a voltage output that varies in response to pressure. An output characterizing pressure is generated by determining a spring constant of the force-responsive component based on the Brownian motion, and using the spring constant together with detected movement of the force-responsive component to determine an amount of pressure applied thereto.

Brownian motion is determined in one or more of a variety of manners. In some implementations, noise due to random thermal excitations of the force-responsive component is filtered from an output indicative of a resonant frequency of the force-responsive component, and the Brownian motion is determined based upon the magnitude of a signal at the resonant frequency in the filtered output. In other implementations, Brownian motion is determined based on a frequency peak in a voltage spectrum corresponding to movement of the force-responsive component.

Brownian motion is used to address pressure sensing issues in a variety of manners, to suit particular embodiments. In some embodiments, the force generated by Brownian motion of atoms and molecules surrounding a sensor is used as a reference force. Since the amplitude of the Brownian force is determined by laws of thermodynamics, its magnitude is independent of sensor degradation or variations in the environment. An on-chip calibration approach thus involves temperature-based measuring of the motion response of a sensor to excitation by Brownian forces at one or more of the sensor's resonance frequencies, using a single chip.

In accordance with various embodiments, Brownian motion may be characterized as follows. In thermal equilibrium (i.e., in the absence of fast temporal temperature variations), a spring-mass resonance mode contains an kinetic and potential energy of $E=E_{kin}+E_{pot}=k_BT$, half of which is stored as kinetic energy in the form of velocity fluctuations $<v^2>$, with $<E_{kin}>=\frac{1}{2} m<v^2>=\frac{1}{2} k_B T$, and half is stored as potential energy in the form of position fluctuations $<E_{pot}>=\frac{1}{2} k<x^2>=\frac{1}{2} k_BT$. The symbols $<>$ indicate a time or ensemble average, and $<x^2>$ is sometimes called the mean squared displacement. The spectrum of the position fluctuations is given by the following equation:

$$\langle x(\omega)\rangle^2 = \frac{2\omega_0^3 k_B T/(kQ)}{(\omega_0^2-\omega^2)^2+(\omega_0\omega/Q)^2},$$

where $\omega_0=2\pi f_{res}$ is the angular resonance frequency, $k_B$ is Boltzmann's constant ($1.38\times10^{-23}$ J/K), T is temperature, and Q is the resonator's $Q_{factor}$. Although the frequency spectrum of the sensor depends on parameters Q and $\omega_0$ that might drift in time, the integral of the position spectrum depends (e.g., only) on temperature T:

$$\frac{1}{2}k_BT_{eff} \equiv \frac{1}{2}k\int_{-\infty}^{\infty}\langle x_\omega^2\rangle \frac{d\omega}{2\pi} = \frac{1}{2}k\langle x^2\rangle.$$

Although the integral runs over all frequencies, an accurate value of $\langle x^2 \rangle$ can be obtained by taking the integral from $f_{res}-5 f_{res}/Q$ to $f_{res}+5/Q$ (and multiplying by 2 to account for the negative frequencies). The spring constant can be determined using the equation:

$$k = k_B T / \langle x^2 \rangle$$

Accurate electronic measurement of the Brownian motion at room temperature may be achieved in an electrical measurement at 0.2 mA. For general information regarding Brownian motion, and for specific information regarding applications of Brownian motion that may be implemented in connection with one or more embodiments, reference may be made to P. G. Steeneken, K. Le Phan, M. J. Goossens, G. E. J. Koops, G. J. A. M. Brom, C. van der Avoort and J. T. M. van Beek, "Piezoresistive heat engine and refrigerator," Nature Physics 7, 354-359 (2011), which is fully incorporated herein by reference.

Various embodiments are directed toward implementation of a mechanical force sensor that can generally be modeled as a mechanical resonator with three unknown parameters: mass m, damping b and spring constant k. These can be rewritten in a spring constant k, resonance frequency $\omega_0$ and quality factor Q. The resonance spectrum of such a resonator is given by:

$$x = \frac{F \omega_0^2 / k}{\omega_0^2 - \omega^2 + i \omega_0 \omega / Q}. \qquad 1.1$$

The values of $\omega_0$ and Q are determined by fitting the shape of the resonance spectrum.

When the sensor is solely excited at its resonance frequency by Brownian forces, calibration is carried out using an equation for the Brownian noise spectrum as follows, which does not contain F, but rather temperature T that characterizes the magnitude of the Brownian forces:

$$\langle x(\omega) \rangle^2 = \frac{2 \omega_0^3 k_B T / (kQ)}{(\omega_0^2 - \omega^2)^2 + (\omega_0 \omega / Q)^2}$$

By using an absolute temperature measurement circuit, calibration is desirably achieved.

In some implementations involving a sensor with Brownian motion, the output voltage of the displacement detector is given by $\langle V_{out}(f)^2 \rangle = a^2 \langle x(f)^2 \rangle + \langle V_{bg}(f)^2 \rangle$ where $V_{bg}$ is the signal contribution to sources un correlated with the sensor. For mechanical structures with sufficiently high Q factor (Q>~10), the resonance mode $\langle x(f)^2 \rangle$ caused by the Brownian motion is detected as a peak in the output voltage spectrum and separated from frequency-independent background noise contribution $\langle V_{bg}^2(f) \rangle$, as may be implemented in accordance with the plots in FIG. 3. An on-chip spectrum analyzer is used to measure this peak, which is integrated over a sufficiently large frequency range after subtracting background noise. In some implementations, the integration is carried out electronically using a resolution bandwidth of the spectrum analyzer that is bigger than the peak width. In another implementation, the integration is carried out by taking a resolution bandwidth that is smaller than the peak width, measuring at many points and subsequently summing all points.

Figure 1:
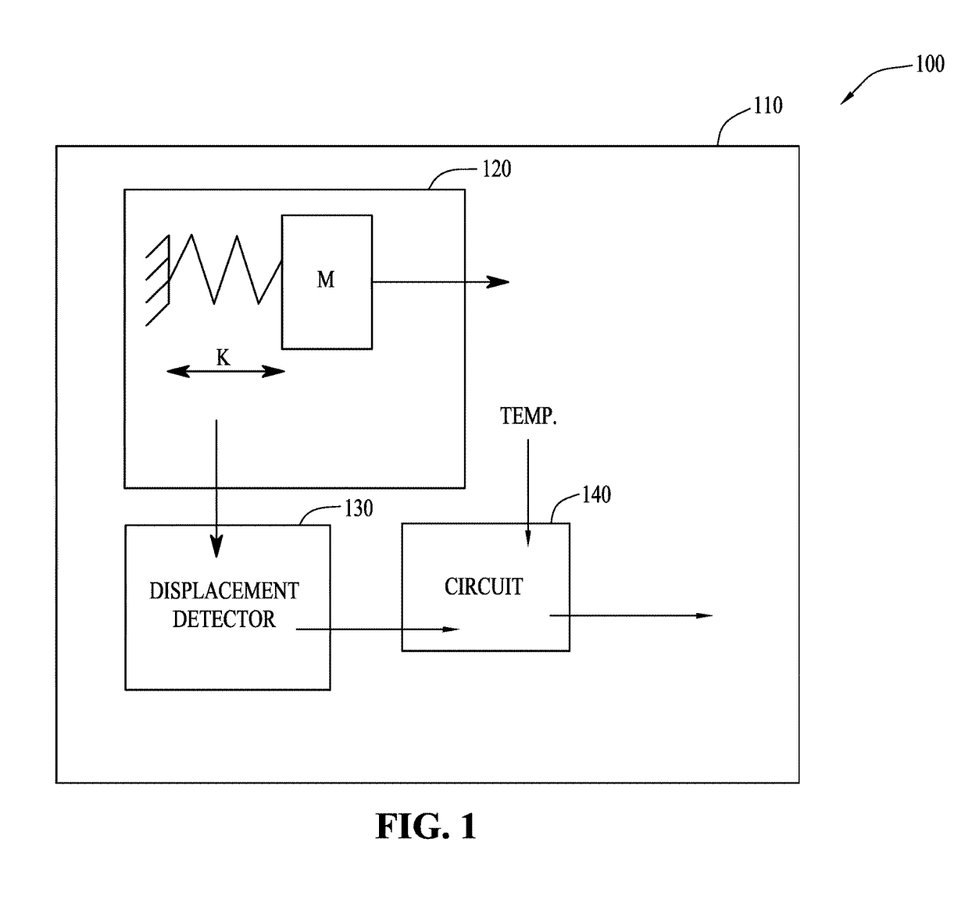
FIG. 1 shows a sensor apparatus, in accordance with an example embodiment.

Turning now to the figures, FIG. 1 shows a sensor apparatus 100, in accordance with an example embodiment. The apparatus 100 includes a sensor chip 110 having a force-responsive component 120 having a resonant frequency and mechanical structure having mass "m" and spring constant "k" that is susceptible to fluctuation. A displacement detector 130 detects displacement of the mass "x," and the apparatus measures external forces by the effect on the displacement. The displacement detector 130 converts an output of the force-responsive component 120 to an output signal (e.g., a voltage $V_{out}$). A calibration and pressure determination circuit 140 operates to compensate for variations in the spring constant k, based on a temperature input and determined Brownian motion. In some implementations, the circuit 140 determines Brownian motion of the force-responsive component at the resonant frequency based on temperature, and generates an output based on the determined Brownian motion and movement of the force-responsive component, with the output being indicative of force applied to the apparatus.

Figure 2:
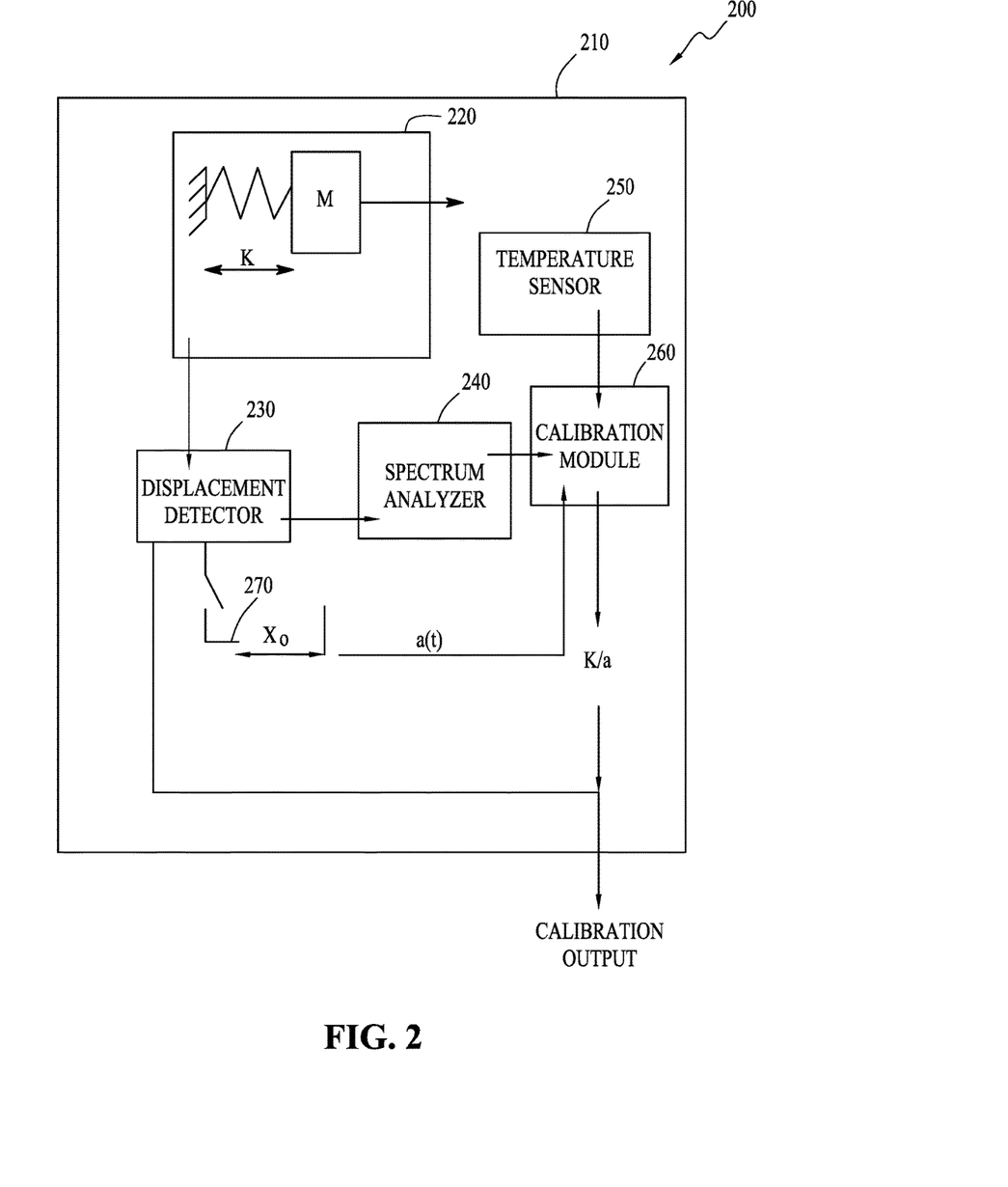
FIG. 2 shows another sensor apparatus, in accordance with another example embodiment.

FIG. 2 shows another sensor apparatus 200 including a chip 210, in accordance with another example embodiment. A force-responsive component 220 has a mas m and spring-type aspect having a spring constant K, which provide an output based on an applied external force $F_{ext}$ and a force due to Brownian noise $F_{Brownian\ noise}$. A displacement detector 230 detects displacement of the mass, and provides an indication of the detected displacement as a voltage $V_{out}$ to a spectrum analyzer 240.

For calibrating and/or compensating the spectrum analyzer 240 analyzes the displacement output for identifying peaks, and a temperature sensor 250 detects temperature on the chip 210. A calibration module 260 uses values from these components, along with a reference value provided by reference circuit 270, to determine a calibration/compensation output k/a, which is used to calibrate or otherwise compensate for errors in the detected displacement due to issues as discussed herein.

More specifically, measurement of $\langle V_{out}^2(f_{res}+\Delta f) \rangle = \langle V_{bg}(f)^2 \rangle$ is made at a frequency spacing $\Delta f \gg f_{res}/Q$ that is different than a resonance frequency of the sensor 200. The mode $\langle V_{out,cor}^2 \rangle = \int_{BW} (\langle V_{out}^2(f) \rangle - \langle V_{bg}^2(f) \rangle) df$ is measured and integrated over a full resonance peak width (over a bandwidth BV of at least 4 $f_{res}/Q$), with background correction over the same frequency range.

In some implementations, the displacement detector 230 is calibrated by connecting it to the reference circuit 270, which may provide a value corresponding to a reference displacement distance $x_0$. The reference circuit 270 may, for example, be implemented as a capacitor with a fixed capacitance value, to accurately determine a constant a(t) using the relation $a(t) = V_{out}/x_0$.

The relation $\int_{BW} \langle x(f)^2 \rangle df = k_B T/(2k)$ is used to determine, from the previous measurements, the quantity $a^2/k$ using the determined temperature, and using the equation:

$$\alpha = \frac{\left[ \int_{f_{res}-BW/2}^{f_{res}+BW/2} \langle V_{out}^2(f) \rangle df \right] - BW \langle V_{out}^2(f+\Delta f) \rangle}{\frac{1}{2} k_B T} = \frac{a^2}{k}$$

A calibration constant $\beta = a/\alpha = k/a$ along with $\alpha$ may be determined in accordance with the above equations, and used with the calibration module 260 for providing a calibrated output according to the equation $F_{ext} = \beta V_{out}$.

Figure 3:
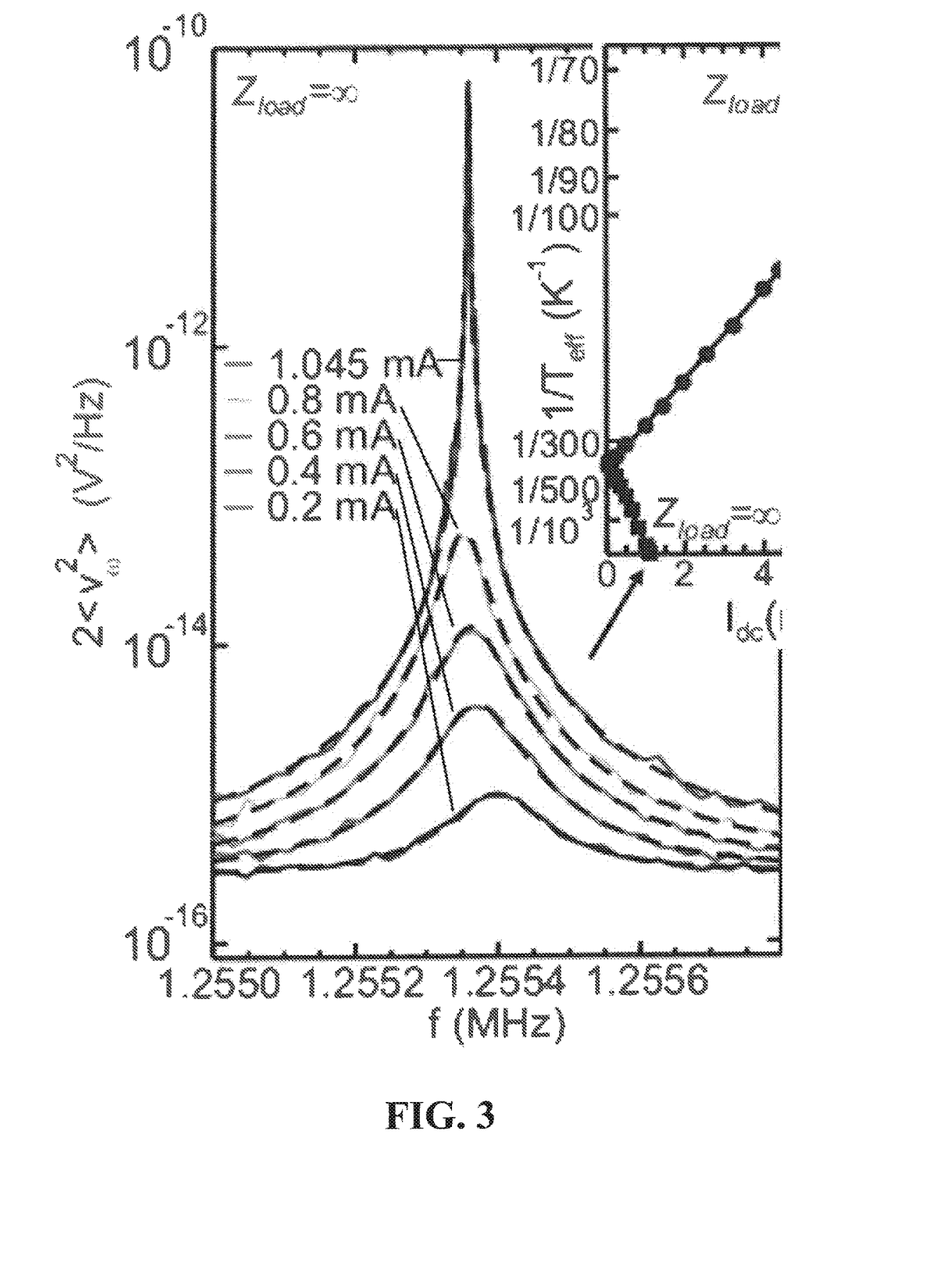
FIG. 3 shows plots of sensor-frequency characteristics that are used in sensor applications, in accordance with another example embodiment.

FIG. 3 shows plots of sensor-frequency characteristics that are used in sensor applications, in accordance with another example embodiment. Respective plots are shown for 0.2 mA, 0.4 mA, 0.6 mA, 0.8 mA and 1.045 mA. Peaks are shown in a voltage spectrum (e.g., from sensor 220 in FIG. 2) as may be denoted by $<V(f)^2>$ and caused by Brownian motion of a resonator with Q=~10000. The peaks may, for example, be measured using electrical (piezoresistive) readout. The 0.2 mA curve is at room temperature, and the remaining curves are measured by boosting the Brownian motion with a feedback system. Such a feedback system may be implemented with drift that is much less in time than drift exhibited by a sensor and displacement detector for which the plots are used. Boosting the Brownian motion at the resonance frequency facilitates detection and calibration methods and systems in certain implementations.

Figure 4:
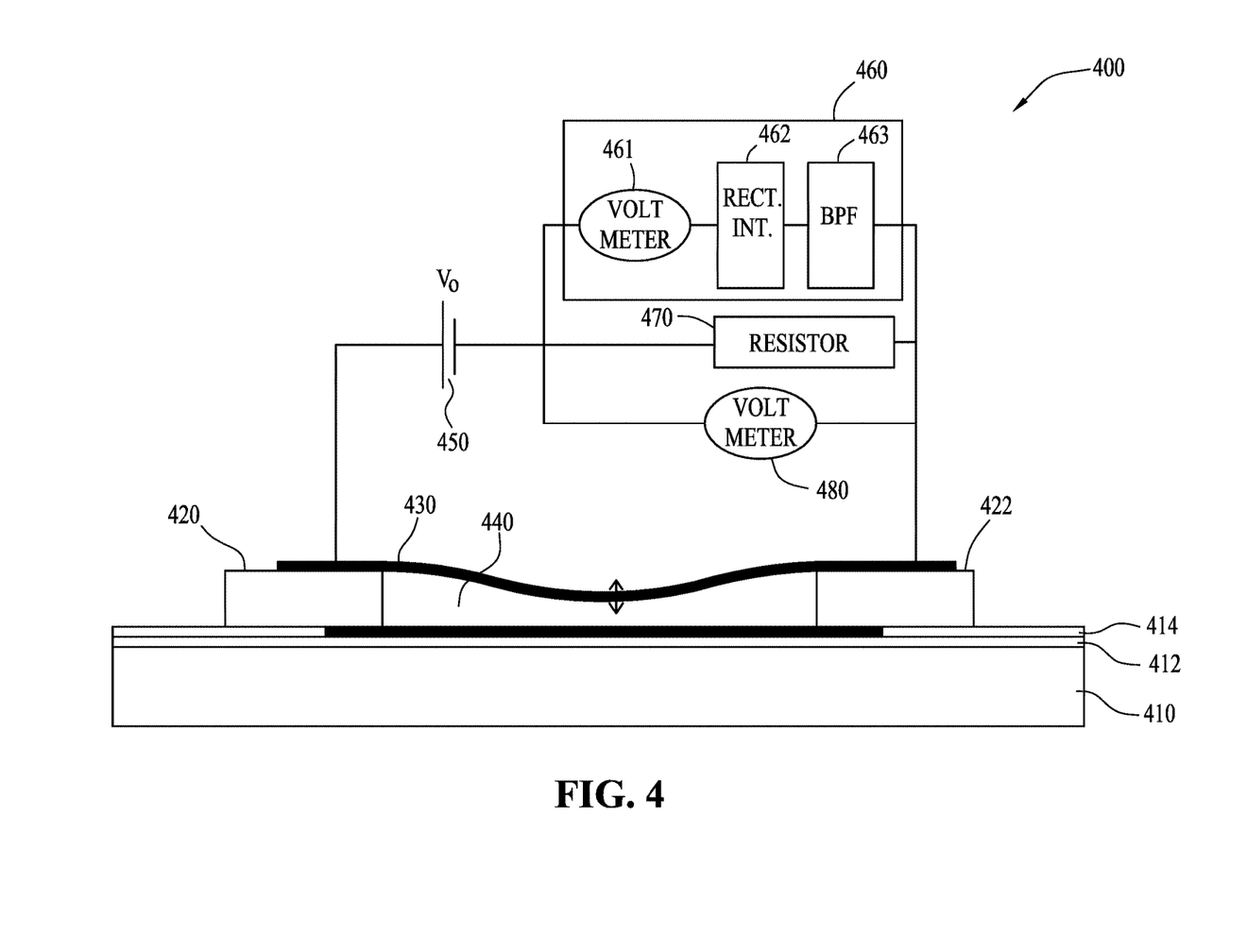
FIG. 4 shows another sensor apparatus, in accordance with another example embodiment.

FIG. 4 shows another sensor apparatus 400, in accordance with another example embodiment. The apparatus 400 includes substrate 410 upon which an electrical isolation or dielectric layers 412 and 414 are formed (one or more such layers may be implemented). Respective electrodes 420 an 422 are located on the isolation/dielectric layer 414, and a piezoresistive membrane 430 extends between the electrodes and defines an hermetic cavity 440. The arrow on the membrane 430 represents small amplitude Brownian/thermal motion. Resistance of the membrane 430 is responsive to deflection amplitude, and thus provides a detectable characterization of the deflecation, via electrodes 420 and 422.

The apparatus 400 also includes a spectrum analyzer 460 that integrates spectral power using a bandpass filter 463 over a resonance peak of the membrane 430. The output of the bandpass filter 463 is passed through a rectifier/integrator 462 that rectifies and integrates the output. Voltmeter 461 is calibrated using a bandgap reference and Brownian motion. Resistor 470 has a relatively low temperature coefficient of resistance, and is coupled as shown in parallel with a DC voltmeter (providing $V_{dc}$) 480, and in series with DC voltage source $V_0$ 450. Accordingly, the output of the voltmeter 461 can be used to determine $<x^2>$, with the DC voltage $V_{dc}$ from the voltmeter being measure of $<x>$ (DC displacement). The membrane has a spring constant given by $k=kB\ T/<x^2>$. The relation holds that A $(P_{ambient}-P_{ref})=k<x>$, where A is the membrane area, $P_{ambient}$ is ambient pressure and $P_{ref}$ is a reference pressure. As such, $P_{ambient}=P_{ref}+(kB\ T<x>)/(A<x^2>)$, according to the temperature given by the sensor.

The various embodiments described herein may be combined in certain embodiments, and various aspects of individual embodiments may be implemented as separate embodiments." For instance, aspects of FIG. 2 may be implemented using plots as shown in FIG. 3. Similarly, aspects shown in FIG. 4 may be implemented with the apparatus 200 in FIG. 2, such as in place of the force-responsive component 220. In addition, various embodiments involve methods relating to the above and other discussion herein, with regard to manufacturing and/or operating the described and other sensing components. Various embodiments involve methods relating to the above and other discussion herein, with regard to manufacturing and/or operating the described and other sensing components.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., detecting displacement, analyzing spectra, or calibrating). For example, in certain of the above-discussed embodiments, one or more modules are discrete logic circuits or programmable logic circuits configured and arranged for implementing these operations/activities, as in the circuit modules shown in FIG. 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, embodiments herein described in connection with pressure sensing may be implemented for a variety of different types of sensing approaches. Such modifications do not depart from the true spirit and scope of various aspects of the invention, including aspects set forth in the claims.

The invention claimed is:

1. A calibration apparatus comprising:
   a force-responsive component, having a resonant frequency and being configured and arranged to move in response to an applied force in accordance with a spring constant that is susceptible to fluctuation;
   a displacement detector configured to detect a movement of the force-responsive component and calibrated by a connection to a reference circuit; and
   a circuit configured and arranged to determine Brownian motion of the force-responsive component at the resonant frequency based on temperature, and to generate a calibrated output based on the determined Brownian motion and the movement of the force-responsive component, the calibrated output being indicative of force applied to the apparatus,
   wherein the reference circuit provides a reference value including at least one of a fixed capacitance, resistance, and voltage, and the reference circuit is configured and arranged with a model that describes dependence of the reference value on atmospheric parameters, and is configured and arranged to use the model to generate the reference value.

2. The calibration apparatus of claim 1, wherein the circuit is configured and arranged to use the determined Brownian motion to determine a change in a value of the spring constant and generate the calibrated output using the determined change in value to correlate the detected movement of the force-responsive component to the force applied to the apparatus.

3. The calibration apparatus of claim 2, wherein the circuit is configured and arranged to generate the calibrated output using a model of the movement of the force-responsive component, the model being based upon characteristics of the force-responsive component including mass, temperature, damping, resonant frequency, and the spring constant.

4. The calibration apparatus of claim 3, wherein the circuit further comprises:
a spectrum analyzer configured and arranged to detect a Brownian motion-based peak in resonance of the force-responsive component, the circuit being configured and arranged to integrate the peak over a frequency range and use the result of the integration to determine the Brownian motion of the force-responsive component at about the resonant frequency.

5. The calibration apparatus of claim 1, wherein the force-responsive component is configured and arranged to provide a voltage output that characterizes the applied force and that varies based upon the applied force and fluctuations in the spring constant, and the circuit further comprises:
a temperature sensor;
the reference circuit including at least one of a capacitance, resistance and voltage source; and
a spectrum analyzer having a fixed amplitude and frequency range, wherein the displacement detector is configured and arranged to detect displacement of the force-responsive component using the at least one of a capacitance, resistance, and voltage source, and the circuit is configured to estimate Brownian motion noise based on an output of the spectrum analyzer indicative of a Brownian motion-based peak in resonance of the voltage output, use the estimated Brownian motion noise and temperature detected by the temperature sensor to determine a value of the spring constant, and generate the calibrated output by determining pressure applied to the force-responsive component, based on the determined value of the spring constant and the detected displacement.

6. The calibration apparatus of claim 1, wherein the circuit is configured and arranged to determine the Brownian motion by filtering noise in a frequency range that includes a resonance frequency from an output indicative of motion of the force-responsive component, and determine a mean squared amplitude of the Brownian motion based upon the filtered output.

7. The calibration apparatus of claim 1, wherein the circuit is configured and arranged to determine the Brownian motion based on a frequency peak in a voltage spectrum corresponding to movement of the force-responsive component by increasing a Brownian motion component of the voltage spectrum via feedback.

8. The calibration apparatus of claim 1, wherein the displacement detector is configured and arranged to generate a displacement output that characterizes displacement of the force-responsive component, and to use the characterized displacement to characterize the movement of the force-responsive component.

9. The calibration apparatus of claim 1, wherein the force-responsive component is configured and arranged to provide a voltage output that varies in response to pressure, and the circuit is configured and arranged to generate the calibrated output by determining the spring constant based on the Brownian motion, and using the spring constant and the movement of the force-responsive component to determine an amount of pressure applied to the force-responsive component.

10. A calibration method comprising:
providing a force-responsive component, having a resonant frequency and being configured and arranged to move in response to an applied force in accordance with a spring constant that is susceptible to fluctuation;
detecting, with a displacement detector, a movement of the force-responsive component;
providing a circuit that is configured and arranged to determine Brownian motion of the force-responsive component at the resonant frequency based on temperature, and to generate a calibrated output based on the determined Brownian motion and the movement of the force-responsive component, the output being indicative of force applied to the force-responsive component;
calibrating the displacement detector by a connection to a reference circuit; and
using the reference circuit to provide a reference value including at least one of a fixed capacitance, resistance, and voltage,
wherein the reference circuit is configured and arranged with a model that describes dependence of the reference value on atmospheric parameters, and is configured and arranged to use the model to generate the reference value.

11. The calibration method of claim 10, wherein providing the circuit further comprises:
using the determined Brownian motion to determine a change in a value of the spring constant; and
using the determined change in the value of the spring constant to correlate the detected movement of the force-responsive component to the force applied to the force-responsive component.

12. The calibration method of claim 10, further comprising:
using the force-responsive component to provide a voltage output that characterizes the applied force and that varies based upon the applied force and fluctuations in the spring constant, wherein providing the circuit further comprises:
providing a temperature sensor, at least one of a capacitance, resistance, and voltage source, and a spectrum analyzer having a fixed amplitude and frequency range;
using the displacement detector to detect displacement of the force-responsive component using the at least one of the capacitance, resistance, and voltage source as a reference; and
using the circuit to estimate Brownian motion noise based on an output of the spectrum analyzer indicative of a Brownian motion-based peak in resonance of the voltage output, use the estimated Brownian motion noise and temperature detected by the temperature sensor to determine a value of the spring constant, and determine pressure applied to the force-responsive component based on the determined value of the spring constant and the detected displacement.

* * * * *